United States Patent
Esler et al.

(10) Patent No.: US 9,417,048 B2
(45) Date of Patent: Aug. 16, 2016

(54) CAPACITIVE SENSOR DEVICE AND METHOD OF MANUFACTURE

(71) Applicant: General Electric Company, Schenectady, NY (US)

(72) Inventors: David Richard Esler, Gloversville, NY (US); Emad Andarawis Andarawis, Ballston Lake, NY (US); Wayne Charles Hasz, Pownal, VT (US); Mahadevan Balasubramaniam, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 960 days.

(21) Appl. No.: 13/665,192

(22) Filed: Oct. 31, 2012

(65) Prior Publication Data
US 2014/0119884 A1    May 1, 2014

(51) Int. Cl.
*F01D 11/20* (2006.01)
*G01B 7/14* (2006.01)

(52) U.S. Cl.
CPC ........................................ *G01B 7/14* (2013.01)

(58) Field of Classification Search
CPC ......... F01D 11/20; F01D 11/22; F01D 11/24; G01B 7/14
USPC ................ 415/1, 13, 14, 173.1, 173.2, 173.4; 324/664, 683, 686
See application file for complete search history.

(56) References Cited

U.S. PATENT DOCUMENTS

| | | | |
|---|---|---|---|
| 4,804,905 A | 2/1989 | Ding et al. | |
| 5,101,165 A * | 3/1992 | Rickards | G01B 7/14 324/662 |
| 5,123,863 A * | 6/1992 | Frederick | H01R 9/0515 439/578 |
| 5,166,626 A | 11/1992 | Hester et al. | |
| 5,760,593 A | 6/1998 | Lawrence et al. | |
| 5,892,365 A | 4/1999 | Bailleul et al. | |
| 5,973,502 A * | 10/1999 | Bailleul | G01B 7/14 324/662 |

(Continued)

FOREIGN PATENT DOCUMENTS

| | | |
|---|---|---|
| GB | 2225855 A | 6/1990 |
| JP | 06139836 A * | 5/1994 |

OTHER PUBLICATIONS

Walker et al., Brazing and Soldering Today, Welding Journal, Oct. 2008.*

(Continued)

*Primary Examiner* — Nathaniel Wiehe
*Assistant Examiner* — Woody A Lee, Jr.
(74) *Attorney, Agent, or Firm* — Pabrita K. Chakrabarti

(57) ABSTRACT

A capacitive sensor device and a method of manufacture are provided. The capacitive sensor device includes at least one sensor tip that includes an electrode positioned at a first end of the sensor tip, and a stem member coupled to the electrode and extending toward a second end of the sensor tip. The device also includes a coaxial cable including a center conductor, the center conductor coupled to the sensor tip at the second end, and an insulation layer supporting the sensor tip between the first and second ends. The insulation layer includes a metallization on a portion surrounding the second end of the sensor tip. The device further includes a casing surrounding a portion of the coaxial cable, the metallization, and the coupling of the center conductor and the sensor tip, wherein a braze joint is formed between the casing and the metallization to form a hollow, hermetic cavity.

22 Claims, 3 Drawing Sheets

(56) References Cited

U.S. PATENT DOCUMENTS

| | | | |
|---|---|---|---|
| 7,180,305 | B2 | 2/2007 | Andarawis et al. |
| 7,215,129 | B1 | 5/2007 | Andarawis et al. |
| 7,332,915 | B2 | 2/2008 | Andarawis et al. |
| 7,333,913 | B2 | 2/2008 | Andarawis et al. |
| 7,404,331 | B2 | 7/2008 | Ruud et al. |
| 7,466,143 | B2 | 12/2008 | Andarawis et al. |
| 7,652,489 | B2 | 1/2010 | Dasgupta et al. |
| 7,722,310 | B2 | 5/2010 | Balasubramaniam et al. |
| 7,852,092 | B2 | 12/2010 | Andarawis et al. |
| 7,853,427 | B2 | 12/2010 | Chan et al. |
| 2003/0222638 | A1* | 12/2003 | Twerdochlib ............ G01B 7/14 324/207.16 |
| 2003/0222640 | A1* | 12/2003 | Twerdochlib ......... F01D 21/003 324/207.17 |
| 2006/0239813 | A1 | 10/2006 | Shah et al. |
| 2009/0003991 | A1 | 1/2009 | Andarawis et al. |
| 2009/0243628 | A1 | 10/2009 | Andarawis |
| 2010/0077830 | A1 | 4/2010 | Andarawis et al. |
| 2010/0079136 | A1* | 4/2010 | Phillips ................... F01D 11/20 324/207.16 |
| 2010/0188100 | A1 | 7/2010 | Andarawis et al. |
| 2010/0191502 | A1 | 7/2010 | Ren et al. |
| 2011/0006791 | A1 | 1/2011 | Schneider et al. |
| 2011/0097522 | A1 | 4/2011 | Hasz |
| 2012/0024073 | A1 | 2/2012 | Guo |

OTHER PUBLICATIONS

Triaxial Cable Definition, ATIS Telecom Glossary, 2007.*
Mohammadi, "MEMS Pressure, Temperature and Conductivity Sensors for High Temperature and Harsh Environments", Dissertation, The University of British Columbia, Apr. 2011, 122 pages, Vancouver, BC, Canada.
EP Search Report and Written Opinion dated Feb. 3, 2014, issued in connection with corresponding EP Patent Application No. 13190888.1.

* cited by examiner

CAPACITIVE SENSOR DEVICE AND METHOD OF MANUFACTURE

BACKGROUND

The field of the disclosure relates generally to capacitive sensors, and more specifically, to a capacitive sensor device and method of manufacturing the same for measuring clearance between two objects.

Various types of sensors are used to measure distance between objects in various applications. For example, in turbo machinery applications, such as turbine systems, the clearance between a static shroud and turbine blades may be measured using a sensor disposed within the turbine. The clearance is greatest when the turbine is cold, and gradually decreases as the turbine heats up and as it spins up to speed. It is desirable that a gap or clearance between the turbine blades and the shroud be maintained for safe and effective operation of the turbine. The measured distance may be used to direct movement of the shroud to maintain the desired displacement between the shroud and the turbine blades.

In some applications, capacitance probe sensors are employed to measure the distance between two objects. Typically, when such sensors are placed in high temperature environments, a signal processing unit of a sensor is required to be located in an ambient environment at a distance from the probe. Normal turbo machinery has a temperature gradient that reduces with a radial distance from a gas flow path contained within the shroud. In corrosive and/or high temperature gas flow paths, such known sensors have a limited lifetime, for example 100-500 hours as compared to the lifetime of the turbines in which they are installed, which may be multiple thousands of hours. Over time, the high temperature and corrosive gas flow paths may cause cracks in probe tips and/or insulation of the sensors, enabling moisture ingress into the sensor tip cavity and subsequent degradation.

BRIEF DESCRIPTION

In one embodiment, a capacitive sensor device is provided. The capacitive sensor device includes at least one sensor tip that includes an electrode positioned at a first end of the sensor tip, and a stem member coupled to the electrode and extending toward a second end of the sensor tip. The device also includes a coaxial cable including a center conductor, the center conductor coupled to the sensor tip at the second end, and an insulation layer supporting the sensor tip between the first and second ends. The insulation layer includes a metallization on a portion surrounding the second end of the sensor tip. The device further includes a casing surrounding a portion of the coaxial cable, the metallization, and the coupling of the center conductor and the sensor tip, wherein a braze joint is formed between the casing and the metallization to form a hollow, hermetic cavity.

In another embodiment, a turbo-machine is provided. The turbo-machine includes a rotor having a plurality of blades, a shroud surrounding the plurality of blades, and a capacitive sensor device provided in the shroud. The capacitive sensor device includes at least one sensor tip that includes an electrode positioned at a first end of the sensor tip, and a stem member coupled to the electrode and extending toward a second end of the sensor tip. The device also includes a coaxial cable including a center conductor, the center conductor coupled to the sensor tip at the second end, and an insulation layer supporting the sensor tip between the first and second ends. The insulation layer includes a metallization on a portion surrounding the second end of the sensor tip. The device further includes a casing surrounding a portion of the coaxial cable, the metallization, and the coupling of the center conductor and the sensor tip, wherein a braze joint is formed between the casing and the metallization to form a hollow, hermetic cavity.

In yet another embodiment, a method is provided for manufacturing a capacitive sensor device. The method includes inserting at least one sensor tip into an insulation layer. The sensor tip includes an electrode at a first end thereof and a stem member protruding from the electrode toward a second end, wherein the first and second ends extend beyond the insulation layer. The method also includes coupling the sensor tip to a center conductor of a coaxial cable and coupling a casing to the insulation layer and the coaxial cable. The casing surrounds at least a portion of the insulation layer, at least a portion of the coaxial cable, and the coupling of the at least one sensor tip to the center conductor. The coupling includes brazing the casing to a metallization of the insulation layer.

DRAWINGS

DETAILED DESCRIPTION

The following detailed description illustrates embodiments of the invention by way of example and not by way of limitation. It is contemplated that the embodiments of the invention has general application to analytical and methodical embodiments of clearance measurement in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
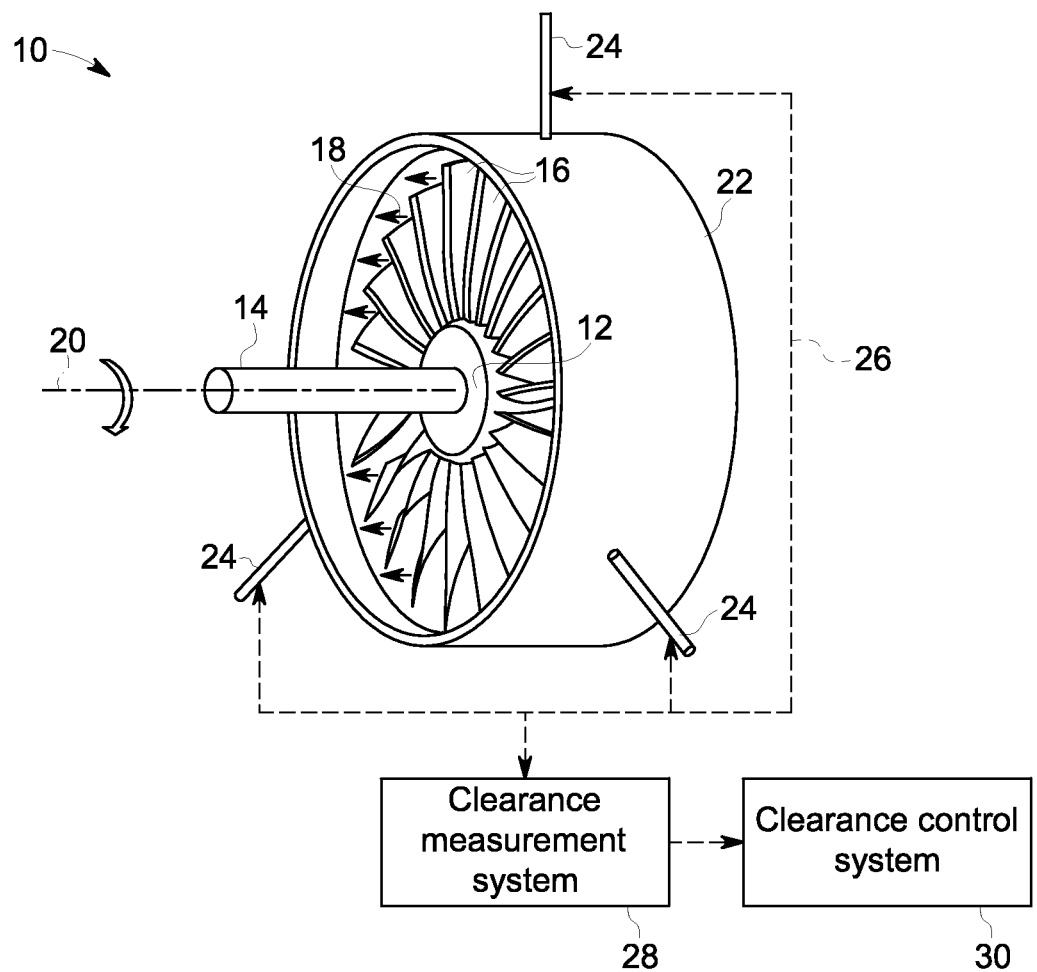
FIG. 1 is a perspective view of an exemplary rotating machine, such as an aircraft engine turbine, wherein aspects of the present technique may be incorporated.

FIG. 1 is a perspective view of an exemplary rotating machine, such as an aircraft engine turbine 10, wherein aspects of the present device may be incorporated. It should be noted here, however, that the present device may be used in any other rotating machine such as but not limited to steam turbines and gas turbines. In the exemplary embodiment, turbine 10 includes a rotor 12 mounted on a shaft 14. A plurality of turbine blades 16, are affixed to rotor 12. In operation, blades 16 are subject to a fluid 18 at a high temperature and pressure, which does work on blades 16 and causes them to rotate about an axis 20. Blades 16 rotate within a stationary housing or shroud 22 that is positioned approximately radially and circumferentially around blades 16. There is a relatively small clearance between blades 16 and shroud 22 to prevent excessive leakage of the working fluid between blades 16 and shroud 22. In the ideal no loss system, there should be no clearance, so all the fluid will work on blades 16 only. However, that configuration will make movement of blades 16 impossible due to the resistance between blades 16 and shroud 22 or to prevent rubs between blades 16 and shroud 22. A zero clearance system is also impractical because of vibrations and accelerated part wear.

In one embodiment, one or more capacitive sensor devices 24 are disposed within and circumferentially around shroud 22. In the exemplary embodiment, clearance sensors 24 are capacitive probe sensors 24. Clearance sensors 24 provide variable capacitance as a representation of the clearance. In some embodiments, clearance sensors 24 include microwave based sensors, optical sensors, or eddy current sensors. Each sensor 24 is configured to generate a signal indicative of a radial and/or an axial position of blades 16 with respect to shroud 22 at their respective circumferential locations. Sensor signals 26 are transmitted to a clearance measurement system 28 for measuring clearance. Further, the clearance measurement through clearance measurement system 28 is used for controlling the clearance between shroud 22 and blades 16 via a clearance control system 30.

Figure 2:
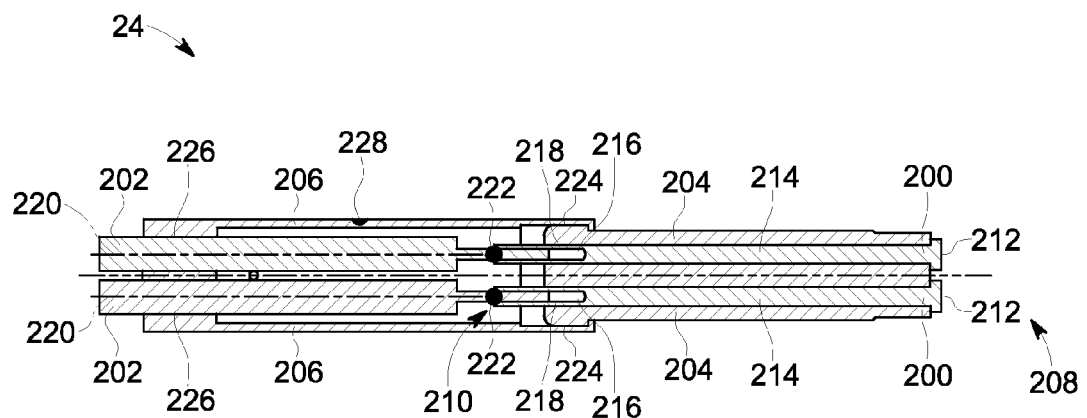
FIG. 2 is an enlarged cross-sectional view of the exemplary clearance sensor shown in FIG. 1.

FIG. 2 is an enlarged cross-sectional view of the exemplary clearance sensor 24 shown in FIG. 1. In the exemplary embodiment, clearance sensor 24 includes at least one sensor tip 200, at least one coaxial cable 202, an insulation layer 204, and a casing 206.

Figure 3:
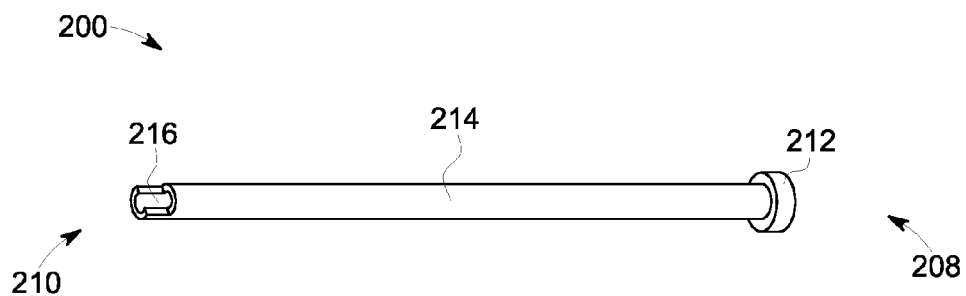
FIG. 3 is an enlarged perspective view of an exemplary sensor tip that may be used with the clearance sensor shown in FIG. 2.

FIG. 3 is an enlarged perspective view of an exemplary sensor tip 200 that may be used with the clearance sensor 24 shown in FIG. 2. Referring to FIGS. 2 and 3, in the exemplary embodiment, clearance sensor 24 includes two sensor tips 200. However, clearance sensor 24 may include any number of sensor tips 200 that enables clearance sensor 24 to function as described herein. In the exemplary embodiment, sensor tip 200 includes a first end 208 and a second end 210. At first end 208, sensor tip 200 includes a flat planar electrode 212. A cylindrical stem member 214 projects perpendicularly from electrode 212 and extends toward second end 210. At second end 210, a recess 216 is defined along an axial length of stem member 214. Recess 216 is designed to be hermetic such that, when clearance sensor 24 is assembled, no outside elements may enter clearance sensor 24. If outside elements (i.e., moisture) are exposed to stem member 214 of sensor tip 200, electrical characteristics of sensor tip 200 may be altered, causing a negative effect on calibration and/or operation of clearance sensor 24.

In the exemplary embodiment, sensor tip 200 is manufactured using a platinum rhodium alloy composition having up to 99.99% purity. The platinum rhodium alloy composition includes about 90% platinum and about 10% rhodium, which may be adjusted to optimize sensor tip 200 for different high temperature turbo machinery. In an alternative embodiment, for lower temperature corrosive turbo machinery applications (e.g. steam turbines), up to 99.99% pure platinum or platinum iridium may be used to manufacture sensor tip 200.

Sensor tip 200 may be formed using known methods such as machining, forging, or casting. In one embodiment, sensor tip 200 is annealed after forming Annealing induces ductility and relieves internal stresses of sensor tip 200 to decrease the possibility of structural failure and/or cracking of sensor tip 200.

Sensor tip 200 includes hollow recess 216. Recess 216 has an axial length that is larger than the axial length of the braze joint coupling sensor tip 200 to insulation layer 204, which is typically defined by metallization length of at least 50%. This space relieves internal stresses of sensor tip 200 to decrease the possibility of structural failure and/or cracking of sensor tip 200. In one specific embodiment of the invention, the recess overlaps the metallization.

In the exemplary embodiment, after forming, sensor tip 200 is inserted into an insulation layer 204. In the exemplary embodiment, insulation layer 204 is cylindrical and is made of a ceramic material. More specifically, in the exemplary embodiment, insulation layer 204 is made of alumina having a purity of 94% to 99%. The alumina metallization includes about 50% molybdenum and about 50% manganese. In other embodiments, insulation layer 204 may be made of aluminosilicate, borosilicate, stabilized zirconia, and any combination thereof. Sensor tip 200 has a diameter that is less than or substantially equal to an opening of insulation layer 204 to facilitate insertion of sensor tip 200 into insulation layer 204. Subsequent to insertion, second end 210 of sensor tip 200 is mechanically deformed, or flared, such that sensor tip 200 cannot be removed from insulation layer 204. This provides the mechanical retention required for systems that cannot allow tip liberation into the gas flow path.

In the exemplary embodiment, insulation layer 204 and sensor tip 200 are coupled by a braze seal 218 to form a hermetic design such that, when clearance sensor 24 is assembled, no outside elements or gases may enter clearance sensor 24. As discussed above, outside elements (i.e., moisture) may cause degradation of sensor tips 200 and cause erroneous calibration of clearance sensor 24.

Coaxial cable 202 is coupled to sensor tip 200 for enabling communication between sensor tip 200 and electronic components of clearance measurement system 28 (shown in FIG. 1). More specifically, cable 202 includes a center conductor 220 that is coupled to sensor tip 200 through recess 216 of stem member 214 such that center conductor 220 has electrical contact with sensor tip 200. In the exemplary embodiment, clearance sensor 24 includes two coaxial cables 202. However, clearance sensor 24 may include any number of coaxial cables 202 that enables clearance sensor 24 to function as described herein.

Center conductor 220 may be made of suitable platinum alloy materials including, but not limited to, platinum, platinum rhodium, and/or platinum iridium. The platinum alloy center conductor 220 offers adequate high temperature capabilities, resistance to oxidation, low electrical resistivity, and high bond reliability to sensor tip 200.

In the exemplary embodiment, center conductor 220 is coupled to sensor tip 200 by a spot weld joint 222. In other embodiments, center conductor 220 may be coupled to sensor tip 200 using a braze joint, a laser weld joint, or any other suitable method of coupling similar metals. Two main failure modes of braze joining sensor tip 200 to cable 202 are an open circuit due to inconsistent braze flow and loss of the hermetic seal due to filling recess 216, which causes increased stiffness and cracking in sensor tip 200. Because center conductor 220 and sensor tip 200 are made of similar platinum-based materials, the possibility of metal diffusion at high operating temperatures is substantially decreased. The similar metal group also reduces physical metal property change due to metal migration and/or intermetallic growth over time.

In an alternative embodiment, sensor tip 200 may be coupled to a copper center conductor tip having a suitable metal barrier plating where temperature extremes and cumulative cycles during product life are lower, such as in a steam turbine. For example, a suitable metal barrier plating may include nickel. The barrier prevents metal migration between platinum and copper and is a low cost alternative to a platinum center conductor wire. The barrier metal may be a thin plating applied locally to the exposed center conductor via chemical plating or other similar methods. Center conductor 220 may be coupled to sensor tip 200 using a braze joint, a laser weld joint, or any other suitable method of coupling sensor tip 200 to copper using a barrier metal.

The electronic components (not shown) of clearance measurement system 28 (shown in FIG. 1) cannot withstand the high operating temperatures of turbine 10 (shown in FIG. 1) and, accordingly, are typically positioned a distance of about twenty feet away from clearance sensor 24. Accordingly, cable 202 has sufficient length to communicatively couple sensor tip 200 to clearance measurement system 28.

In an alternative embodiment, a transition may be made from using platinum alloy for center conductor 220 to using copper. In turbo machinery applications, temperature decreases in severity as distance increases from shroud 22 (shown in FIG. 1). Accordingly, as cable 202 egress distance increases from the shroud, it is amenable to transition to a copper center conductor coaxial cable. Transitioning introduces a number of advantages for clearance sensor 24. One advantage of this transition is that platinum has a resistivity about six times greater than copper, which may cause higher transmission losses, especially at high frequencies. This enables high frequency radio frequency (RF) signals in the gigahertz range to be used. Such high frequency RF signals facilitate increased bandwidth and sensing fidelity. Another advantage is that copper is much more economical than platinum. A further advantage is that transitioning enables the use of a different diameter cable 202. The platinum cable 202 used at second end 210 is limited in diameter by the wire egress size of sensor tip 200. It is further constrained by the mounting structure in shroud 22. Transitioning to a larger conductor cable helps to reduce electrical losses in cable 202.

The transition may occur via a high temperature spring based splice or a high temperature make-break connector. If the spring based splice is used, the type of spring is dependent on the temperature and/or vibration conditions at the transition location. Such transitions are commercially available. This transition is added to a brazed clearance sensor 24 that is shorter in length than the clearance sensor without the transition. The location of the transition from first end 208 of sensor tip 200 is calculated such that the transition components remain below their temperature limits. One advantage of brazing a short sensor 24 is that multiple samples may be batch-processed in a small vacuum braze chamber. Short cables do not outgas as much as long lengths of cables, which improves yield during braze operation. Moreover, short cables simplify mechanical fixturing of the cable, braze material, casing, sensor tips, and insulator, and provide the ability to braze short sensor 24 such that the axis of the probe is in the vertical direction, enabling gravity to aid in braze flow. In an alternative embodiment, a small coil may be made in the cabling in the vacuum braze chamber to enable slightly longer cable lengths of up to 3 feet.

In the exemplary embodiment, casing 206 is provided about insulation layer 204 for additional protection from high operating temperatures. Casing 206 is cylindrical and hollow to receive insulation layer 204, sensor tip 200, and cable 202. In the exemplary embodiment, casing 206 is made of a highly temperature resistant and anti-corrosive metal, such as stainless steel. A braze joint 224 couples casing 206 to insulation layer 204, and a braze joint 226 couples casing to cable 202.

Braze seal joints 218, 224, and 226 create a hermetic seal in the cavities formed between sensor tip 200, insulation layer 204, cable 202, and casing 206. In the exemplary embodiment, the material used for brazing is 99.9% pure gold or a gold alloy, such as nickel or a copper-gold alloy. Braze joints 218, 224, and 226 are located at a sufficient distance from first end 208 of sensor tip 200 to remain below the temperature capacity of the braze material. In one embodiment, casing 206 includes a small hole 228 (shown in FIG. 2) that enables hermeticity testing following the brazing operations within clearance sensor 24. Hole 228 is positioned at a position on casing 206 such that it is located a sufficient distance away from high temperatures and the harsh environment created near electrode 212. Hole 228 enables a vacuum application that creates a pressure differential to be introduced into the interior of casing 206. A helium flow is then introduced and, in combination with the pressure differential, it may be determined whether there exists any leakage in the brazed seals. After completion of leakage testing, hole 228 is then sealed shut using a weld.

Figure 4:
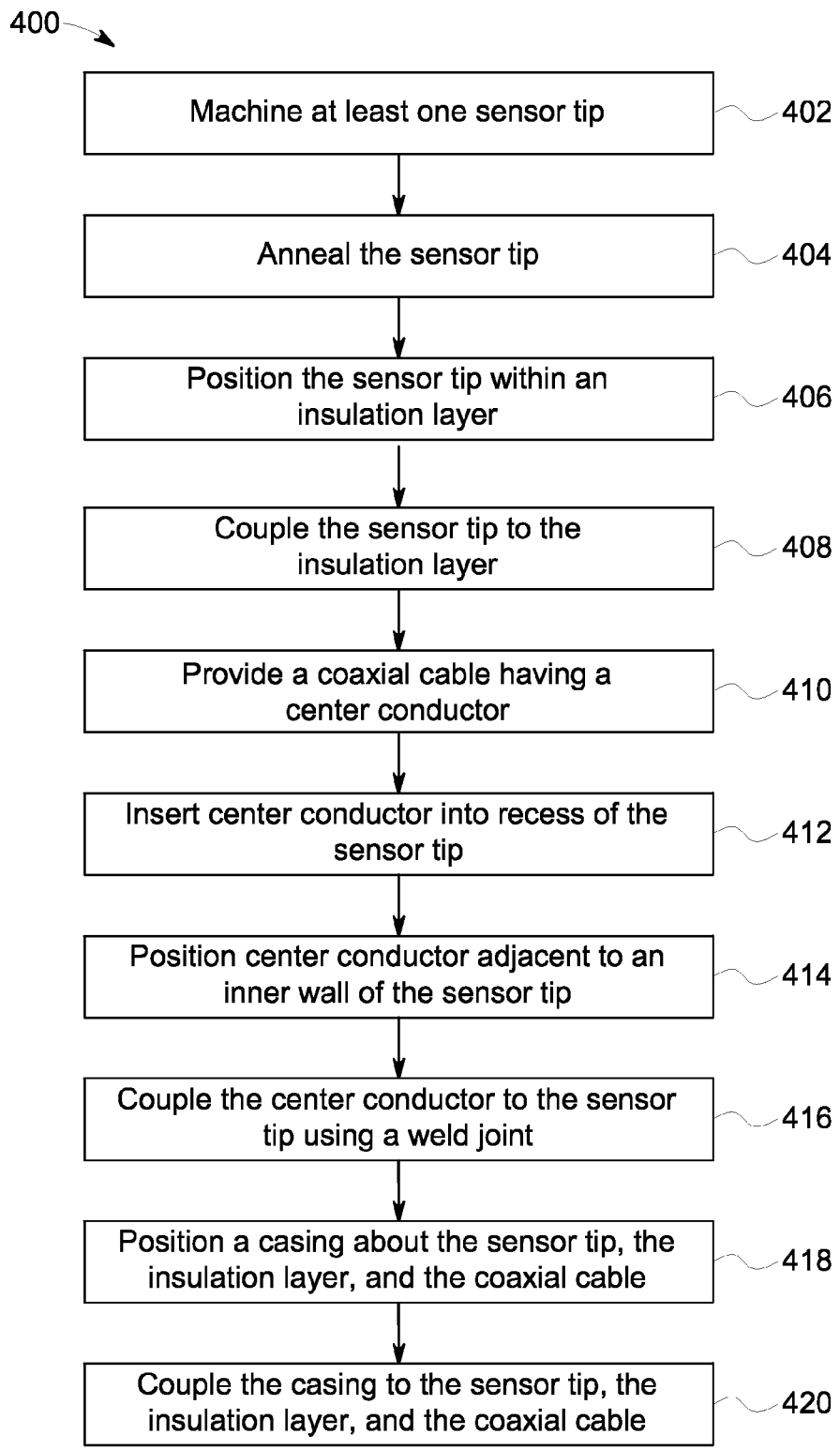
FIG. 4 is a flowchart of an exemplary method of manufacturing the clearance sensor shown in FIGS. 1 and 2.

FIG. 4 is a flowchart 400 of an exemplary method of manufacturing a clearance sensor, such as clearance sensor 24, shown in FIG. 2. Unless otherwise specified, similar components are identified in FIG. 4 with the same reference numerals used in FIG. 2. In the exemplary embodiment, at least one sensor tip 200 is formed 402. Sensor tip 200 includes an electrode 212 at a first end 208, and a stem member 214 protruding from electrode 212 toward a second end 210, wherein stem member 214 defines a recess 216 at second end 210. In the exemplary embodiment, sensor tip 200 is formed using a platinum rhodium alloy composition having up to 99.99% purity. The platinum rhodium alloy composition includes about 90% platinum and about 10% rhodium. Sensor tip 200 is then annealed 404 to induce ductility and relieve internal stresses of sensor tip 200 to decrease the possibility of structural failure and/or cracking of sensor tip 200.

The annealed sensor tip 200 is then positioned 406 within an insulation layer 204 such that only a portion of electrode 212 of sensor tip 200 protrudes from insulation layer 204. In the exemplary embodiment, insulation layer 204 is cylindrical and is made of a ceramic material. More specifically, in the exemplary embodiment, insulation layer 204 is made of alumina having a purity of 94% to 99%. The alumina metallization includes about 50% molybdenum and about 50% manganese. Sensor tip 200 is coupled 408 to insulation layer 204 to hermetically seal any spaces between sensor tip 200 and insulation layer 204. In one embodiment, a braze joint is used to couple sensor tip 200 and insulation layer 204.

In the exemplary embodiment, a coaxial cable 202 having a center conductor 220 is provided 410. At one end, coaxial cable 202 is coupled to second end 210 of sensor tip 200. At the other end, coaxial cable 202 is coupled to clearance measurement system 28 (shown in FIG. 1). More specifically, center conductor 220 is inserted 412 into recess 216 of sensor tip 200 and positioned 414 adjacent to an inner wall of sensor tip 200 to form an electrical connection. In the exemplary embodiment, center conductor 220 is then coupled 416 to sensor tip 200 using a weld joint. Center conductor 220 may be made of suitable platinum alloy materials including, but not limited to, platinum, platinum rhodium, and/or platinum iridium. In an alternative embodiment, a transition may be provided to transition the platinum alloy center conductor 220 to a copper center conductor 220. In other embodiments, center conductor may be made of copper and have a barrier metal at the copper-to-sensor tip connection.

In the exemplary embodiment, casing 206 is positioned 418 about the assembly formed by sensor tip 200, insulation layer 204, and coaxial cable 202. Casing 206 is coupled 420 to the assembly such that casing 206 circumscribes at least a portion of insulation layer 204 and at least a portion of coaxial cable 202. In the exemplary embodiment, casing 206 is coupled to the assembly using braze joints or the like.

The above-described embodiments of a clearance sensor device and method of manufacture for measuring clearance between two objects provides a cost-effective and reliable means monitoring process parameters in heretofore difficult areas of components that experience harsh environmental conditions. More specifically, the clearance sensor device and method of manufacture described herein can operate properly and accurately for thousands of hours. In addition, the above-described clearance sensor device and method of manufacture facilitate reducing oxidation of the sensor tip electrode over repeated cycling in harsh environments and further facilitate reducing oxidation of conductors providing wiring egress. Moreover, the same metal-type connection of the sensor tip to the center conductor reduces the possibility of having an open circuit. Finally, the clearance sensor device and method of manufacture described herein provides the ability to manufacture shorter clearance sensors and add on a long length of cable. As a result, the clearance sensor device and method of manufacture described herein facilitate operating hot temperature components in a cost-effective and reliable manner.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A capacitive sensor device comprising:
   at least one sensor tip comprising an electrode positioned at a first end of said at least one sensor tip, and a stem member coupled to said electrode and extending toward a second end of said at least one sensor tip;
   a coaxial cable comprising a center conductor, the center conductor coupled to said at least one sensor tip at the second end, wherein said center conductor is coupled to an inner surface of said at least one sensor tip through a hollow recess in the second end of said at least one sensor tip using a weld joint, and wherein said hollow recess is defined along an axial length of said stem member;
   an insulation layer supporting said at least one sensor tip between the first and second ends, said insulation layer including a metallization on a portion surrounding the second end of said at least one sensor tip; and
   a casing surrounding a portion of said coaxial cable, the metallization of said insulation layer, and the coupling of said center conductor and said at least one sensor tip, wherein a braze joint is formed between said casing and the metallization to form a hollow, hermetic cavity.

2. A device in accordance with claim 1, wherein the recess overlaps the metallization.

3. A device in accordance with claim 2, wherein an axial length of the recess is larger than an axial length of the braze joint.

4. A device in accordance with claim 1, wherein said at least one sensor tip and said center conductor comprise at least one of platinum, platinum rhodium alloy, and platinum iridium alloy.

5. A device in accordance with claim 1, wherein said insulation layer comprises alumina.

6. A device in accordance with claim 1, wherein said insulation layer comprises at least one of aluminosilicate, borosilicate, and stabilized zirconia.

7. A device in accordance with claim 1, wherein said at least one sensor tip is coupled to said center conductor by a braze joint.

8. A device in accordance with claim 1, wherein said at least one sensor tip is coupled to said center conductor by one of a spot-weld and a laser weld joint.

9. A device in accordance with claim 1, wherein said at least one sensor tip is annealed.

10. A device in accordance with claim 1, wherein the metallization comprises 50% molybdenum and 50% manganese.

11. A device in accordance with claim 1, wherein said casing comprises stainless steel.

12. A device in accordance with claim 1, wherein said braze joint comprises one of gold, gold nickel alloy, and gold copper alloy.

13. A device in accordance with claim 1, further comprising a transition component for transitioning said center conductor to a copper center conductor at a predetermined distance from said electrode.

14. A device in accordance with claim 13, wherein said transition component comprises one of a spring-based splice and a make-break connector.

15. A device in accordance with claim 1, further comprising a second braze joint between said at least one sensor tip and said insulation layer.

16. A device in accordance with claim 15, further comprising a third braze joint between said casing and said coaxial cable.

17. A device in accordance with claim 1, wherein said casing comprises a hole to introduce a pressure differential into the interior of casing.

18. A turbo-machine comprising:
   a rotor having a plurality of blades;
   a shroud surrounding the plurality of blades; and
   a capacitive sensor device provided in the shroud, said capacitive sensor device comprising:
   at least one sensor tip comprising an electrode positioned at a first end of said at least one sensor tip, and a stem member coupled to said electrode and extending toward a second end of said at least one sensor tip;
   a coaxial cable comprising a center conductor, the center conductor coupled to said at least one sensor tip at the second end, wherein said center conductor is coupled to an inner surface of said at least one sensor tip through a hollow recess in the second end of said at least one sensor tip using a weld joint, and wherein said hollow recess is defined along an axial length of said stem member;
   an insulation layer supporting said at least one sensor tip between the first and second ends, said insulation layer including a metallization on a portion surrounding the second end of said at least one sensor tip; and
   a casing surrounding a portion of said coaxial cable, the metallization of said insulation layer, and the coupling of said center conductor and said at least one sensor tip, wherein a braze joint is formed between said casing and the metallization to form a hollow, hermetic cavity.

19. A turbo machine in accordance with claim 18, further comprising:
   a clearance measurement system connected to said capacitive sensor device; and
   a clearance control system configured to control clearance between said shroud and the plurality of blades based on signals produced by said capacitive sensor device.

20. A method of manufacturing a capacitive sensor device, said method comprising:

inserting at least one sensor tip into an insulation layer, the sensor tip including an electrode at a first end thereof and a stem member protruding from the electrode toward a second end, wherein the first and second ends extend beyond the insulation layer;

coupling the at least one sensor tip to a center conductor of a coaxial cable, wherein said center conductor is coupled to an inner surface of said at least one sensor tip through a hollow recess in the second end of said at least one sensor tip using a weld joint, and wherein said hollow recess is defined along an axial length of said stem member; and coupling a casing to the insulation layer and the coaxial cable, wherein the casing surrounds at least a portion of the insulation layer, at least a portion of the coaxial cable, and the coupling of the at least one sensor tip to the center conductor, wherein the coupling comprises brazing the casing to a metallization of the insulation layer.

21. A turbo machine in accordance with claim 18, wherein said casing comprises a hole to introduce a pressure differential into the interior of casing.

22. A method of manufacturing a capacitive sensor device in accordance with claim 20, said method comprising introducing a pressure differential into the interior of said casing by using a hole positioned on the casing; and testing hermeticity of said casing using said pressure differential.

* * * * *